United States Patent [19]

Yoshida et al.

[11] Patent Number: 4,529,481

[45] Date of Patent: Jul. 16, 1985

[54] SYNTHETIC POLYESTER PULP AND PROCESS FOR PREPARING SAME

[75] Inventors: Makoto Yoshida, Ibaraki; Tadashi Hirakawa, Kusatsu, both of Japan

[73] Assignee: Teijin Ltd., Osaka, Japan

[21] Appl. No.: 527,378

[22] Filed: Aug. 29, 1983

Related U.S. Application Data

[60] Continuation of Ser. No. 322,891, Nov. 19, 1981, abandoned, which is a division of Ser. No. 156,482, Jun. 4, 1980, abandoned.

[30] Foreign Application Priority Data

Jun. 11, 1979 [JP] Japan ................................. 54-72180
Sep. 20, 1979 [JP] Japan ............................... 54-120006

[51] Int. Cl.$^3$ ............................................. D21H 5/12
[52] U.S. Cl. .................................. 162/157.3; 162/146; 264/143; 264/171; 264/211; 428/400; 428/401; 428/903
[58] Field of Search ................. 162/157.2, 157.3; 264/143, 174, 176 F, 211, 140, 49, 209.1, 209.5; 428/400, 401, 903

[56] References Cited

U.S. PATENT DOCUMENTS

| 3,400,187 | 9/1968 | Farrow | 264/211 |
|---|---|---|---|
| 3,682,846 | 8/1972 | Sano et al. | 264/49 |
| 3,808,091 | 4/1974 | Aoki et al. | 162/157 R |

FOREIGN PATENT DOCUMENTS

| 48-13723 | 4/1973 | Japan | 162/157 R |
|---|---|---|---|
| 49-27602 | 3/1974 | Japan | 162/157 R |
| 1043762 | 9/1966 | United Kingdom | 162/157 R |

*Primary Examiner*—Peter Chin
*Attorney, Agent, or Firm*—Burgess, Ryan & Wayne

[57] ABSTRACT

Synthetic polyester pulps are provided which are comprised of substantially fibrous fibrils made of a linear aromatic polyester, said fibrils (i) having branches at least in part thereof, (ii) being of an oriented crystalline structure, (iii) having cross-sectional shapes that have irregular and unusual contours, and (iv) exhibiting a freeness of from 50 to 700 cc. The fibrils preferably possess an average fiber diameter of smaller than about 10 microns and a fiber diameter variance of not larger than about 0.7. The pulps are prepared by a process, which comprises the steps of: forming a shaped article from a mixture of a linear aromatic polyester and an organic compound which is incompatible with said polyester and soluble in an alkaline solution; treating the shaped article with an alkaline solution so that the polyester ingredient in the shaped article be at least partially hydrolyzed and the organic compound be at least partially dissolved in the alkaline solution; and then, beating the alkaline solution-treated shaped article.

17 Claims, 9 Drawing Figures

5 μm

50 μm

5 μm 3.3μm

5μm

50μm

5μm

5μm

SYNTHETIC POLYESTER PULP AND PROCESS FOR PREPARING SAME

This application is a continuation, of application Ser. No. 322,891, filed Nov. 19, 1981, now abandoned which was a division of application Ser. No. 156,482, filed June 4, 1980, now abandoned the contents of which are incorporated herein by reference.

BACKGROUND OF THE INVENTION (1) Field of the Invention

This invention relates to a synthetic polyester pulp and a process for preparing the synthetic polyester pulp. The polyester pulp has a very fine and relatively uniform fibril structure and can be made advantageously into sheet-like products on conventional paper-making machinery.

(2) Description of the Prior Art

Heretofore, synthetic pulps made of a synthetic, highly polymeric material and synthetic papers made from the pulp by a wet sheet-forming process have been proposed. The conventional synthetic pulps are prepared by various processes which are classified into the following four processes. In a first process, a solution of a highly polymeric material is coagulated by pouring the solution into a poor solvent, which is incapable of dissolving or capable of slightly dissolving the highly polymeric material, while a vigorous shearing and/or beating action is applied to the poor solvent (refer to British Pat. No. 868,651). In a second process, a mixture of two or more synthetic polymeric materials, which are incompatible with each other, is melt-spun into filaments. After the filaments are cut into short lengths, the filaments are mechanically split into fibrils (refer to Japanese Patent Publication No. 9651/1960). In a third process, a mixture of two or more synthetic polymeric materials, which are incompatible with each other, is melt-spun into filaments. After the filaments are cut into short lengths, the filaments are immersed in a solvent capable of selectively leaching one of the polymeric materials (refer to U.S. Pat. No. 3,382,305). In a fourth process, a solution of a synthetic polymeric material maintained at a temperature higher than the boiling point of the solvent used and at a high pressure is ejected into an environment of a low pressure, and the ejected product is beaten (refer to Japanese Patent Publication No. 16,460/1961).

However, it is difficult to prepare synthetic pulps from polyesters, particularly polyetheylene terephthalate, having good mechanical, chemical and electrical properties, by the above-mentioned processes. Namely, even when polyesters are intended to be processed by the above-mentioned first process, there is no solvent suitable for dissolving the polyesters. When polyesters are processed by the above-mentioned second process, the mixed polymer filaments cannot readily be mechanically split into fibrils because polyesters have high mechanical strengths. When polyesters are processed by the above-mentioned third process, first, there is no satisfactory solvent used for selectively leaching the polymers (such as polyamides) incompatible with the polyesters, and, secondly, the resulting pulp is comprised of fibrils which are neither arborescent nor fluffy, and therefore, the resulting paper has poor mechanical strengths. When polyesters are processed by the above-mentioned fourth process, first, there is no satisfactory solvent and secondly, this flash spinning process is costly.

The synthetic polyester pulps prepared by the above-mentioned processes have some disadvantages. For example, the polyester pulp prepared by the first process is characterized as possessing a fibrid structure comprised of fibrous, ribbon-like or foliate stems having tentacular projections. This fibrid structure has relatively large dimensions and, the substantial part of the fibrid structure has a dimension of at least about 10 microns, although only a minor part thereof has a dimension of about one micron. The polyester pulp prepared by the third process is of an oriented fibril structure comprised of fine fibrils entangled with each other. The fibrils of this pulp have relatively round and regular cross-sectional shapes, and the pulp is not completely satisfactory in adaptability to paper making machinery.

SUMMARY OF THE INVENTION

A main object of the present invention is to provide synthetic polyester pulps which are comprised of fine fibrils and exhibit good adaptability to paper making machinery and can be made into sheets or papers of various densities.

Other objects and advantages of the present invention will be apparent from the following description.

In one aspect of the present invention, there is provided a synthetic pulp comprised of substantially fibrous fibrils made of a polyester, said fibrils (i) having branches at least in part thereof, (ii) being of an oriented crystalline structure, (iii) having cross-sectional shapes that have irregular and unusual contours, and (iv) exhibiting a freeness of from 50 to 700 cc. The fibrils preferably possess an average fiber diameter of smaller than about 10 microns and a fiber diameter variance of not larger than about 0.7.

In another aspect of the present invention, there is provided a process for preparing the above-mentioned synthetic polyester pulp, which comprises the steps of:

forming a shaped article from a mixture of a linear aromatic polyester and an organic compound which is incompatible with said polyester and soluble in an alkaline solution, treating the shaped article with an alkaline solution so that the polyester ingredient in the shaped article be at least partially hydrolyzed and the organic compound be at least partially dissolved in the alkaline solution, and then, beating the alkaline solution-treated shaped article.

DESCRIPTION OF THE PREFERRED EMBODIMENTS

Figure 4:
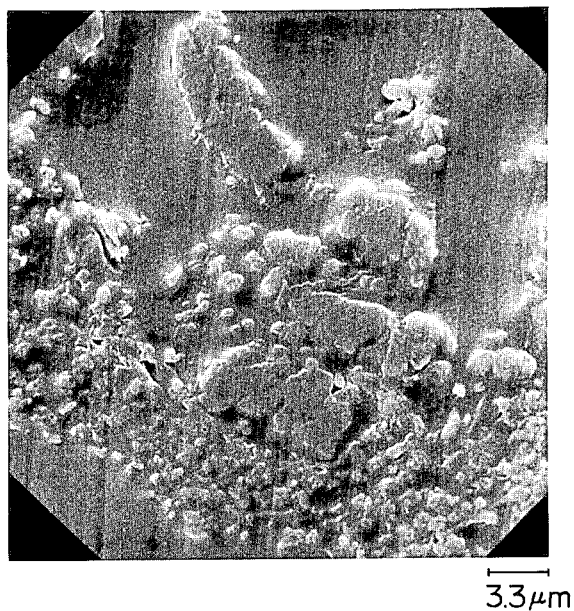
FIG. 4 is a photograph of the cross-section of the beaten filaments shown in FIGS. 2 and 3, observed by using a scanning type electron microscope at a magnification of 3,000X.

The synthetic polyester pulp of the present invention is comprised of substantially fibrous fibrils. The fibrous fibrils are characterized as possessing several properties. First, the fibrils have a plurality of branches on at least part of the fibrils. Such branches enhance the entanglement of the fibrils with each other and impart to the pulp a good adaptability to paper making machinery, leading to enhancement in mechanical strengths of the resulting paper. Secondly, the fibrils are of an oriented crystalline structure, and thus, the resulting paper has high mechanical strengths. Thirdly, the fibrils have cross-sectional shapes that have irregular and unusual contours, as illustrated in the photomicrophotograph of FIG. 4.

Therefore, the fibrils of the polyester pulp of the invention are liable to be entangled with each other in the process of sheet formation and result in a sheet of good mechanical strengths.

Fourthly, the fibrils exhibit a freeness of from 50 to 700 cc, preferably from 100 to 600. By the term "freeness" used herein is meant a freeness of pulp, which is determined by Technical Association of Pulp and Paper Industry Test T227m5D and expressed as the Canadian Standard freeness number. The freeness of the pulp has a close relationship with the adaptability of pulp to paper making machinery. When the freeness is too large, the wet sheet formed from the pulp cannot be smoothly separated from the wire part of a sheet machine. In contrast, when the freeness is too small, the productivity of paper is low.

The synthetic polyester pulp of the invention comprises substantially fibrous fibrils and, when the pulp is used for a filtering medium or separating paper, it exhibits good permeability to various gases and liquids and good filtering characteristics. Particularly, when the fibrils have an average fiber diameter of not greater than 10 microns, preferably not greater than 5 microns, and a variance in fiber diameter of not greater than 0.7, preferably not greater than 0.4, the pulp results in a filtering medium suitable particularly for micro particles such as aerosals. The average fiber diameter is determined as hereinafter mentioned, and the variance in fiber diameter refers to that defined by the equation:

Variance in fiber diameter $(\sigma) = \overline{(D_f^2 - \bar{D_f}^2)} / \overline{D_f^2}$ where $\overline{D_f}$ and $\overline{D_f^2}$ are mean diameter and mean square diameter, respectively.

The synthetic polyester pulp of the invention may be made of any of linear aromatic polyesters. The linear aromatic polyesters include those which are prepared from at least one bifunctional aromatic carboxylic acid ingredient such as therephthalic acid, isophthalic acid, naphthalenedicarboxylic acid and diphenyl-dicarboxylic acid and at least one glycol ingredient such as ethylene glycol, trimethylene glycol, tetramethylene glycol and hexamethylene glycol.

Preferably linear aromatic polyesters comprise at least 80% by mole of a recurring unit represented by the formula:

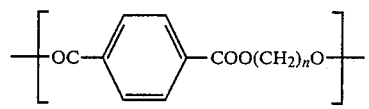

where n is an integer of from 2 to 6. n is preferably 2 and/or 4, namely, at least one glycol selected from ethylene glycol and tetramethylene glycol is preferably used as a main glycol ingredient. Not more than 20% by mole of the polyester may be any recurring unit derived from at least one bifunctional carboxylic acid and at least one glycol. The bifunctional carboxylic acid includes, for example, a bifunctional aromatic carboxylic acid such as isophthalic acid, naphthalenedicarboxylic acid, diphenyl-dicarboxylic acid, diphenoxyethanedicarboxylic acid, β-hydroxyethoxybenzoic acid or p-hydroxybenzoic acid; a bifunctional aliphatic carboxylic acid such as sebacic acid, adipic acid or oxalic acid; or a bifunctional alicyclic carboxylic acid such as 1,4-cyclohexanedicarboxylic acid. The glycol used includes, for example, the above-listed glycols, and other aliphatic, alicyclic and aromatic diol compounds such as cyclohexane-1,4-dimethanol, neopentyl glycol, bisphenol A and bisphenol S.

The linear aromatic polyesters used may be prepared by any conventional procedures. For example, polyethylene terephthalate may be prepared by the following two stage reaction procedure. In the first stage, a glycol ester of terephthalic acid and/or its low molecular weight polymer is prepared either by directly esterifying terephthalic acid with ethylene glycol, by interesterifying a lower alkyl ester of terephthalic acid such as dimethyl terephthalate with ethylene glycol or by reacting terephthalic acid with ethylene oxide. In the succeeding second stage, the reaction product obtained in the first stage is maintained at an elevated temperature under reduced pressure to be thereby polycondensed to the desired extent.

The molecular weight of the linear aromatic polyester is not particularly limited, but it is preferable that its intrinsic viscosity is generally in the range of from 0.3 to 1.15 as measured in o-chlorophenol at 35° C. Provided that the resulting linear aromatic polyester is substantially thermoplastic, a minor amount of a polyfunctional compound having three or more ester-forming functional groups, such as trimellitic acid, pyromellitic acid, glycerine and pentaerythritol, may be used. Furthermore, provided that the resulting polyester has a permissible molecular weight, a minor amount of a monofunctional compound such as benzoic acid may be used.

It is preferable that the synthetic polyester pulp of the invention has a degree of crystallinity of at least 25%, more preferably at least 30%. The degree of crystallinity is determined as follows. The pulp is dried, and one g of the dried pulp is molded at ambient temperature under a pressure of 200 kg/cm² into a pellet having a diameter of 30 mm. The degree of crystallinity is calculated from the equation:

Degree of crystallinity (%) = $[Ic/(Ic+Ia)] \times 100$

The high degree of crystallinity is crucial for providing a synthetic paper of improved thermal resistance, which is useful, for example, as an electrical insulating paper or a honeycomb material.

Wide-angle X-ray diffraction intensity is measured by using a Cu Kα X-ray diffractometer and, after the air scattering intensity is subtracted from the intensity of (010) peak, the peak intensity of (010) plane is divided into $I_c$, i.e., the crystalline intensity, and $I_a$, i.e., the amorphous intensity, by an interception with the straight line drawn between bottoms of the (010) diffraction pattern.

The synthetic polyester pulp of the invention is prepared, as hereinbefore mentioned, by the process which involves (i) a shaped article-forming step, (ii) an alkali-treating step and (iii) a beating step.

In the shaped article-forming step, a mixture of the linear aromatic polyester and an organic compound, which is incompatible with the polyester and soluble in an alkaline solution, is shaped into a desired form. The organic compound preferably possess a solubility parameter $SP_c$ such that the difference ($\Delta SP$) between the solubility parameter $SP_c$ and a solubility parameter $SP_e$ of the linear aromatic polyester satisfies the formula:

$$\Delta SP = |SP_c - SP_e| \geq 2.0,$$

particularly $\Delta SP \geq 3.0$, more particularly $\Delta SP \geq 4.0$. The solubility parameter is the square root of the cohesive-energy density. A more detailed definition thereof and the determining procedure are described in Encyclopedia of Polymer Science and Technology, vol. 12, pp 618-626 (published by Interscience Publishers, 1970).

The organic compound to be incorporated in the linear aromatic polyester includes, for example, metal salts of an organic sulfonic acid, which salts are represented by the formula:

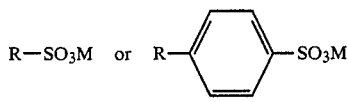

where R is a linear or branched alkyl group having 3 to 30 carbon atoms or an aryl or aralkyl group having 7 to 40 carbon atoms, and M is an alkali metal or an alkaline earth metal. Preferably, organic sulfonic acid salts are, for example, sodium stearylsulfonate, sodium octylsulfonate, sodium dodecylsulfonate, a mixture of sodium alkylsulfonates, the alkyl groups having 14 carbon atoms in average, sodium octylbenzenesulfonate and sodium dodecylbenzenesulfonate. These organic sulfonic acid salts may be used either alone or in combination.

The amount of the organic compound to be incorporated in the polyester is preferably in the range of from 0.1 to 20% by weight, more preferably from 1 to 10% by weight, based on the weight of the polyester. When the amount of the organic compound is too small, the alkali-treated shaped article cannot be smoothly fibrillated upon beating. In contrast, when the amount of the organic compound is too large, it becomes difficult to form the shaped article.

In one preferred process of the shaped article-forming step, two organic compounds, which are incompatible with the linear aromatic polyester and soluble in an alkaline solution, are incorporated in combination. The two organic compounds used have solubility parameters $SP_{c1}$ and $SP_{c2}$, respectively, satisfying the following formulae:

$$|SP_{c1} - SP_e| \geq 4.0 \qquad (1)$$

$$1.0 \leq |SP_{c2} - SP_e| \geq 3.5 \qquad (2)$$

where $SP_e$ is a solubility parameter of the linear aromatic polyester. The first organic compound having $SP_{c1}$ includes organic sulfonic acid metal salts as described above.

The second organic compound having the solubility parameter $SP_{c2}$ satisfying the above-formula includes, for example, polyoxyalkylene glycols. The polyoxyalkylene glycol may be of a copolymerized form. Moreover, the polyoxyalkylene glycol may be terminated with an organic residue having no ester-forming capability. The polyoxyalkylene glycol may be bonded with another organic residue having an ester-forming capability, via an ester, ether or carbonate bond. It is advantageous that the polyoxyalkylene glycol possesses a molecular weight of at least 20,000, preferably at least about 50,000, and more preferably at least about 80,000. There is no particular upper limit of the molecular weight of the polyoxyalkylene glycol, but the molecular weight is usually below 3,000,000. When the molecular weight of the polyoxyalkylene glycol is too small, the alkali-treatment of the resulting shaped article must be conducted for a longer period for obtaining the desired pulp. The long alkali-treatment leads to the reduction in the yield of pulp.

By the combined use of the above-mentioned first and second organic compounds, a synthetic polyester pulp comprising fine and uniform fibrils can be produced at an enhanced yield and with the alkali-treatment of a short period. The amount of each of the first and second organic compounds is preferably from 0.1 to 15% by weight, more preferably from 1 to 10% by weight, based on the weight of the linear aromatic polyester, and the total amount of the first and second organic compounds is preferably from 0.2 to 20% by weight, more preferably from 1 to 15% by weight.

The above-mentioned organic compound can be incorporated in the linear aromatic polyester at any stage prior to the completion of the formation of the shaped article. For example, the organic compound can be added to the monomeric material to be polycondensed, to the interesterification or other first stage reaction mixture, to the polycondensation reaction mixture, or to the polyester product after the polycondensation by melt-blending the organic compound with the polyester in a melt extruder or by introducing the organic compound into the melt shaping apparatus.

The linear aromatic polyester having the organic compound incorporated therein may be formed into a shaped article by a conventional melt-forming procedure. The shaped article may be of any form such as a fiber, a ribbon, a sheet and a rod. Of these forms, a fiber is most preferable because the fiber can be readily cut into short lengths and fibrillated. The fiber may be of any cross-sectional shape. It is optimum, however, that at least a part, particularly, a substantial part of the fiber has a wall thickness of below 6 microns. When a substantial part of the fiber is below 6 microns in wall thickness, the pulp comprised of fibrils having relatively uniform fiber diameters can be obtained at an enhanced yield. In order to provide such a thin wall fiber, it is convenient that the fiber is either hollow or flat.

In the case where the fiber is hollow, both inner and outer contours of the cross-section of the hollow fiber may be of any shape, i.e., round or odd-shaped. It is also possible that the hollow fiber has two or more longitudinally extending hollows. In general, the hollow percentage, i.e., the proportion of the cross-sectional area of the hollow to the apparent total cross-sectional area of the hollow fiber, may be varied in the range of from 5% to 50%. However, the wall thickness of the hollow fiber is determined depending upon the fiber fineness, the inner and outer contours of the fiber cross-section and the hollow percentage. For example, when the inner and outer contours of the fiber cross-section are round, the wall thickness of below 6 microns can be obtained by making the hollow percentage greater than 31% at the fiber fineness of 5 denier or by making the hollow percentage greater than 13.1% at the fiber fineness of 3 denier.

The flat fiber may also be of any cross-sectional shape such as ellipse, rectangle, comb-shape or starfish, or modified shapes thereof. In the case where the flat fiber possesses a rectangular cross-sectional shape, it is preferable that the flatness ratio of the fiber, i.e., the ratio of the length of the long side to the length of the short side in the rectangular cross-section, be at least 4. However, the wall thickness of the fiber is determined depending upon the fiber fineness and the flatness ratio. Therefore, the wall thickness of below 6 microns can be obtained, for example, by making the flatness ratio greater than 11 at the fiber fineness of 5 denier or by making the flatness ratio greater than 6.7 at the fiber fineness of 3 denier.

The hollow or flat fiber may be prepared by melt-spinning the polyester having the organic compound incorporated therein through a spinneret having slits such as horse-shoe-shaped slits or linear slits. The fibers or other shaped articles are usually cut into short lengths prior to the fibers or other shaped articles are treated with an alkaline solution. The cut length is preferably in the range of from 1 to 10 mm. When the fibers have a short length as they are melt-spun, such as blasted fibers, they may not be cut.

The fibers and other shaped articles are preferably heat-treated prior to the alkali-treatment. The heat-treating temperature is preferably equal to or higher than the temperature which is 20° C. higher than the softening point of the organic compound to be incorporated in the linear aromatic polyester, but not higher than the temperature which is 10° C. lower than the softening point of the linear aromatic polyester. The softening point is determined as follows. One mg of a specimen is sandwiched between a pair of slide glasses in a simple micro-melting point meter and, while the temperature of the specimen is raised at a rate of 2° C./minute under a load of 5.8 g, the temperature is observed at which the specimen becomes transparent. By this heat-treatment, internal voids are formed in the suceeding alkali-treating step and the alkali-treated fibers can be fibrillated to a great extent upon beating. The heat treatment can be conducted, either while the fiber or other shaped articles are maintained at a constant length, or under conditions wherein the fiber or other shaped articles are drawn or permitted to shrink. Namely, the heat treatment can be effected either in the drawing step of the drying step, or independently from these steps. The heat treatment may be carried out in a single stage, or in two or more stages under different conditions.

As the alkaline solution with which the shaped article is treated, aqueous solutions are advantageously employed in view of handling properties and costs. The aqueous alkaline solutions include, for example, aqueous solutions of inorganic bases such as sodium hydroxide, potassium hydroxide and sodium silicate, and aqueous solutions of ammonia and organic bases, for example, aliphatic, alicyclic and aromatic amines such as monomethylamine, dimethylamine, trimethylamine, ethylamine, cyclohexylamine and aniline. These inorganic and organic bases may be used alone or in combination.

The amount of the inorganic or organic bases is usually in the range of from 0.5 to 50 moles per mole of the recurring unit of the linear aromatic polyester. The bath ratio of the aqueous alkaline solution may preferably be in the range of from 1:30 to 1:300. The procedure by which the polyester shaped article is treated with the alkaline solution is not particularly limited, but immersion is preferable.

The treating conditions may be varied depending upon the particular base used and the polyester. Moreover, the alkali treatment may be conducted in two or more stages. For example, the alkali treatment can be effected in a single stage process wherein the shaped article is immersed in an aqueous sodium hydroxide solution having a concentration of 30 g/liter at 100° C. for 45 minutes or in an aqueous solution containing 20 g/liter of sodium hydroxide and 10 g/liter of cyclohexylamine at 100° C. for 38 minutes, or in a two stage process wherein the shaped article is immersed first in an aqueous methylamine solution having a concentration of 400 g/liter at ambient temperature for 120 minutes and then in an aqueous sodium hydroxide solution having a concentration of 30 g/liter at 100° C. for 33 minutes.

When the polyester shaped article is treated with the alkaline solution, the polyester ingredient in the shaped article is at least partially hydrolyzed and the organic compound is at least partially dissolved. The hydrolysis of the polyester leads to the weight reduction of the shaped article and, thus, to the reduction in yield of the pulp. In general, the weight reduction of the shaped article in the alkali-treatment stage may be from 10 to 90%, more conveniently from 20 to 80%. It has been found, however, that the combined use of an inorganic base with an organic base such as an organic amine results in the pulp at a higher yield than that achieved by the single use of either an inorganic base or an organic base. It is also convenient to use surface active agents such as anionic surface active agents in order to enhance the efficiency of the alkali treatment.

Figure 1:
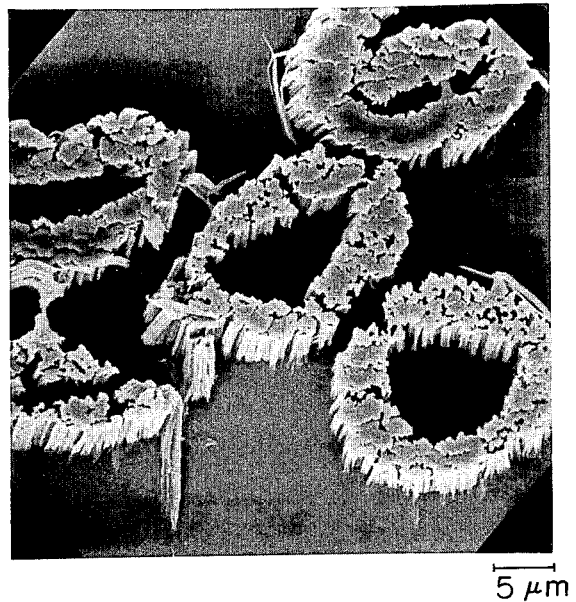
FIG. 1 is a photograph of the cross-section of the alkali-treated filaments, observed by using a scanning type electron microscope at a magnification of 2,000X.
Figure 9:
FIG. 9 is a photograph of the cross-section of the filaments, which have been heat-set and then treated with aqueous alkali, observed by using a scanning type electron microscope at a magnification of 2,000X.

The alkali-treated shaped article has a structure that is partially hydrolyzed and has a cross-sectional shape possessing many projections and contains many voids therein, but that still maintains the shape of the shaped article, as illustrated in the electron microphotograph of FIG. 1. If the shaped article is heat-treated as hereinbefore mentioned and, then, treated with the alkaline solution, the alkali-treated shaped article contains more voids and is capable of being more readily fibrillated as compared with the alkali-treated shaped article which has not been heat-set. An electron microphotograph of the shaped article, which has been heat-set and then treated with alkali, is illustrated in FIG. 9.

The alkali-treated shaped article is subjected to beating to be thereby fibrillated. The beating may be effected by using conventional beaters or refiners. For example, a conical refiner, a cylindrical refiner and various pulverizers and stirrers may be used. A home mixer may also be used. The beating can be carried out not only in a liquid medium such as an aqueous medium but also in air. Electron microphotographs of fibrillated products are illustrated in FIGS. 2, 3, 4, 7 and 8.

Depending upon the intended use of the pulp, the average fiber diameter and the degree of beating may be voluntarily varied. Namely, the average fiber diameter can be varied by changing the particular organic compound incorporated with the polyester and the amount of the organic compound and the alkali-treating conditions. The degree of beating can be varied by changing the alkali-treating conditions and the beating conditions.

The synthetic polyester pulp of the invention can be made into paper by conventional wet papermaking procedures utilizing Fourdrinier or Vat machines, which are popularly employed for the manufacture of paper from wood pulp. The paper so manufactured may be hot-pressed or hot-calendered when the paper is used in a thin and dense form, for example, as an electrical insulation paper.

The resulting synthetic polyester paper possesses satisfactory formation, modulus, tensile strength, folding endurance and printability. However, the synthetic polyester paper possesses poor dielectric properties and, when the paper is used in a high temperature environment, the paper is subject to color changes. This is particularly true when the pulp is prepared with an alkali metal salt of an organic sulfonic acid. It now has been found that such disadvantages can be obviated by reducing the content of univalent metal or metals in the synthetic polyester paper to a level of not more than 100 ppm, particularly not more than 50 ppm. That is, when the content of the univalent metal is extremely low, the color formation occurring during the use of the paper in a high temperature environment can be avoided or minimized, and, the dielectric loss can also be reduced and the peak of the dielectric loss is shifted to the high temperature side. The reduction of the content of a univalent metal or metals can be effected by washing the alkali-treated shaped article and/or the beaten product with water at a temperature of at least 100° C., preferably at least 120° C. The washing procedure is not particularly limited, but it is convenient to immerse the alkali-treated shaped article and/or the beaten product in hot water under agitation.

The synthetic polyester pulp of the invention can be made into paper alone. Alternatively, the pulp may be used in combination with other pulps and/or fibers in order to improve the tear strength, folding endurance or thermal resistance of the paper or to reduce the production cost. The pulps and/or fibers to be combined with the pulp of the invention include, for example, wood pulps such as kraft pulp; synthetic pulps such as those made of an aromatic polyamide, polyacrylonitrile, polyethylene and polypropylene; natural fibers; synthetic fibers such as those made of polyester and polyamide (including aromatic polyamide); and glass fiber, asbestos and other inorganic fibers. It is preferable that the fibers to be combined with the pulp of the invention have an average fiber diameter of no greater than 20 microns, particularly no greater than 10 microns. The amount of the pulp and/or the fiber used in combination may be freely determined depending upon the intended use of the paper, but the amount thereof is usually below 30%, particularly below 20%, based on the total weight of the pulp of the invention and the combined pulp or fiber. If desired, sizing material and/or loading material may be incorporated in the pulp prior to the formation of sheet or coated on the sheet formed from the pulp.

A non-woven fabric or web, which is formed from the pulp of the invention by a wet sheet-forming procedure, may be used either as it is or after a binder is applied thereto. The non-woven fabric or web is useful for, for example, filters, heat insulating materials and sound absorbing materials.

Particularly, the non-woven fabric or web is suitable for filtering mediums for treating aerosols or collecting or arresting dust or for removing impurities from liquids. As hereinbefore mentioned, the fibrous fibrils of the synthetic polyester pulp of the invention have cross-sectional shapes which have irregular and unusual contours. This morphological feature of the pulp serves to provide a non-woven fabric or web which is substantially isotropic both in the plane direction and in the direction perpendicular thereto, and further which exhibits a reduced pressure loss and an enhanced fiber surface area. Thus, the filtering mediums of the non-woven fabric or web possess an excellent capability of arresting dust.

It is preferable that the fibrils of the pulp used for the manufacture of the filtering mediums have an average fiber diameter of from 0.05 to 5 microns, particularly from 0.1 to 3 microns. When the average fiber diameter is too small, the non-woven fabric has undesirably low bulkiness and exhibits a large pressure loss. In contrast, when the average fiber diameter is too large, the capability of arresting dust is poor. It is also preferable that, as hereinbefore mentioned, the fibrils of the pulp have a variance in fiber diameter of not greater than 0.7, particularly not greater than 0.4. Thus, the fiber diameter variance influences the balanced filtering characteristics.

Furthermore, it is preferable that the non-woven fabric or web possesses a porosity of from 0.90 to 0.98, more preferably from 0.92 to 0.97. By the term "porosity" used herein is meant the volume fraction of void in the non-woven fabric which content is defined by the equation:

$$\text{Void} = 1 - [\text{Basis weight of fabric (g/m}^2)/ \text{Thickness of fabric (cm)} \times 10^4 \times \text{True specific gravity of fibril (g/cm}^3)].$$

When the porosity is too small, the filtering characteristics become poor. In contrast, the non-woven fabric of too large porosity exhibits poor form retention.

The invention will be further illustrated by the following examples including the comparative examples, wherein parts and percents are by weight unless otherwise specified. The properties of the pulp and paper are determined as follows.

(i) Yield of pulp (%) is calculated from the equation:

$$\text{Yield} = (W_1/W_0) \times 100(\%)$$

where $W_0$ and $W_1$ are absolute dry weights of the shaped product as measured, respectively, before and after the alkaline solution-treatment.

(ii) Freeness of pulp is determined by Technical Association of Pulp and Paper Industry (abbreviated TAPPI) test T227m5D. The data obtained from this test are expressed as the familiar Canadian Standard freeness number, which represents the number of ml. of water which drains from the aqueous pulp slurry under specified conditions.

(iii) Average fiber diameter of pulp is determined by observing the beaten pulp by using a scanning type electron microscope (2,000× magnification). The fiber diameter (microns) is measured on 50 random specimens and their average value is calculated.

(iv) Tensile strength of paper is measured by using an Instron Tester at a specimen width of 5 mm, a grip distance of 20 mm and a grip separation rate of 20 mm/min.

EXAMPLE 1

A glass flask equipped with a fractionating column was charged with 197 parts of dimethyl terephthalate, 124 parts of ethylene glycol and 0.118 part of calcium acetate monohydrate, followed by interesterifying the contents of the flask in a conventional manner to distil off a theoretical amount of methanol therefrom. The reaction product was placed in a polycondensation flask equipped with a fractionating column, followed by adding thereto 0.112 part of trimethyl phosphate as a stabilizer and 0.079 part of antimony trioxide as a polycondensation catalyst. The content was maintained at a temperature of 280° C., under normal pressure, for 30 minutes and, further, at that temperature, under a pressure of 30 mmHg, for 15 minutes to effect the polycondensation. After the pressure was raised to normal pressure, 10 parts of a sodium alkyl sulfonate mixture were added to the reaction mixture. The sodium alkyl sulfonate mixture used had alkyl groups, which contained an average of 14 carbon atoms and the number of carbon atoms in each of which ranged from 8 to 20. Then, the pressure within the flask was gradually reduced to 0.32 mmHg, over a period of 80 minutes, while the reaction mixture was stirred. The mixed polymer so obtained exhibited an intrinsic viscosity of 0.622, as measured in o-chlorophenol at a temperature of 35° C. The mixed polymer was shaped into chips and, then, dried. The polyethylene terephthalate ingredient exhibited a solubility parameter of 10.7 cal$^{\frac{1}{2}}$/cm$^{3/2}$ and the the sodium alkyl sulfonate mixture exhibited a solubility parameter of larger than 15 cal$^{\frac{1}{2}}$/cm$^{3/2}$.

The dried chips were melt-spun through a spinneret having horse-shoe-shaped slits of 0.05 mm in width and 0.6 mm in diameter by a conventional procedure to obtain a bundle of 36 hollow filaments having a total fineness of 300 denier. The ratio of the outer diameter to the inner diameter of each hollow filament was 2/1, i.e., the hollow percentage was 25%. The hollow filament bundle was drawn 4.2 times its original length in a conventional manner, to obtain 36 filaments having a total fineness of 71 deniers. A plurality of the filament bundles were collected together and cut by using a guillotine cutter into lengths of 1, 3, 5 and 12 mm. 20 g of each length of the cut filaments were immersed in two liters of an aqueous sodium hydroxide solution having a concentration of 25 g/liter and maintained at a temperature of 98±1° C., under agitation, for a predetermined period of time, which period is shown in Table I, below. After that the alkali-treated filaments were washed with water and, then, dried. The yield of the alkali-treated filaments is shown in Table I, below. The alkali-treated filaments were dispersed in one liter of water and, then, beaten by using a home mixer MX-820G (trade name, supplied by Matsushita Denko K.K., Japan) for 30 minutes to obtain a polyester synthetic pulp. The average fiber diameter and freeness of the pulp are shown in Table I, below. The polyester synthetic pulp was dispersed in water at a concentration of 2.2 g/7.9 liters. A paper was manufactured from the aqueous dispersion of the synthetic pulp by using a TAPPI standard sheeting machine supplied by Toyo Seiki K.K., Japan, according to the Japanese Industrial Standard P8209. The obtained wet sheet was dried and, then, pressed under a pressure of 200 kg/cm$^2$ at a temperature of 200° C. for three minutes to obtain a polyester synthetic paper.

In the above-mentioned process for manufacturing the polyester synthetic paper, when the cut filaments having a length of 1 mm were immersed in the aqueous sodium hydroxide solution for a long period of time, neps (i.e., knotted clumps of the filaments) resulted and the resultant paper had a poor tensile strength. When the cut filaments having a length of 12 mm were immersed in the aqueous sodium hydroxide solution for a short period of time, the resultant paper had a poor tensile strength. However, no problems were encountered with any of the pulps prepared from the cut filaments having lengths of 1, 3, 5 and 12 mm during the manufacture of paper therefrom. Among these pulps, those which were prepared by immersing the cut filaments having a length of 3 mm in the aqueous sodium hydroxide solution for a period of from 45 to 60 minutes resulted in the pulp of the highest strength. The tensile strength of the papers obtained from the pulps is shown in Table I, below.

TABLE I

| Run No. | Length of cut filament (mm) | Period of immersion in aq. alkali solution (min.) | Yield (%) | Freeness of pulp (cc) | Average fiber diameter of pulp (microns) | Tensile strength of paper (Kg/mm$^2$) |
|---|---|---|---|---|---|---|
| 1 | 1 | 45 | 40 | 280 | 1.5 | 3.8 |
| 2 | " | 60 | 25 | 252 | 0.9 | 2.9 |
| 3 | " | 90 | 12 | 132 | 0.3 | 2.1 |
| 4 | 3 | 45 | 52 | 360 | 2.5 | 5.2 |
| 5 | " | 60 | 38 | 320 | 1.5 | 5.5 |
| 6 | " | 90 | 20 | 232 | 0.8 | 4.6 |
| 7 | 5 | 45 | 58 | 520 | 4.9 | 3.7 |
| 8 | " | 60 | 46 | 465 | 3.3 | 4.8 |
| 9 | " | 90 | 30 | 370 | 2.1 | 5.4 |
| 10 | 12 | 45 | 63 | 700 | 11.1 | 1.8 |
| 11 | " | 60 | 50 | 670 | 9.5 | 2.1 |
| 12 | " | 90 | 38 | 635 | 8.3 | 3.5 |

Figure 2:
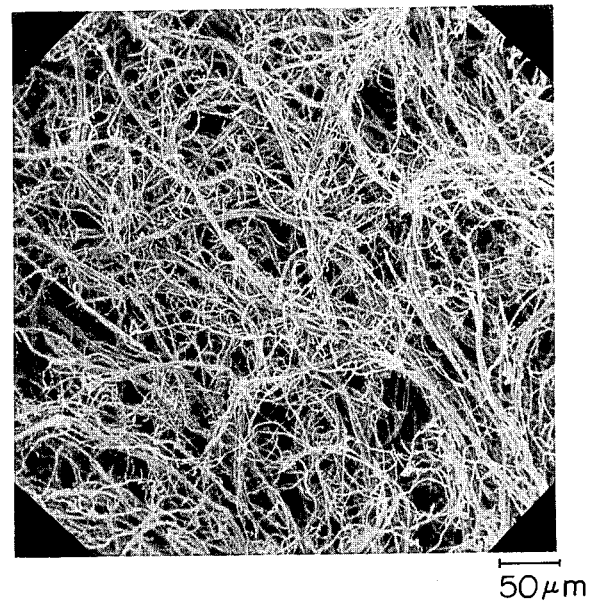
FIG. 2 is a photograph of the beaten filaments, observed by using a scanning type electron microscope at a magnification of 200X.
Figure 3:
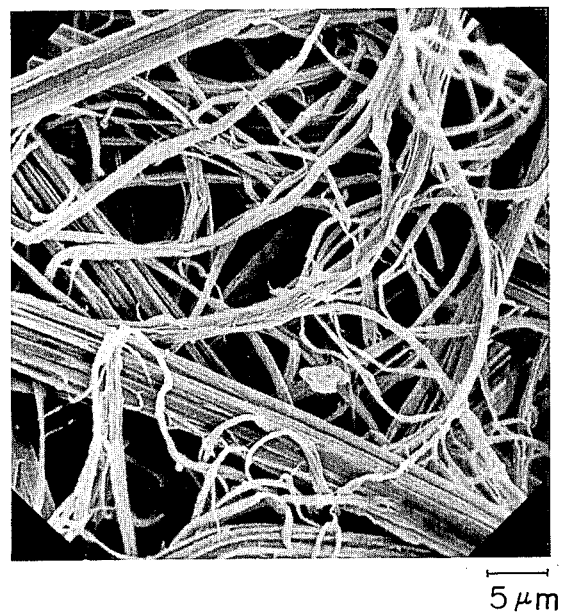
FIG. 3 is a photograph similar to that of FIG. 2 but observed at a magnification of 2,000X.

A photograph of the cross-section of the cut filaments (Run No. 5) after the aqueous alkali treatment, observed by using a scanning type electron microscope, (2,000× magnification) is shown in FIG. 1. Photographs of the beaten filaments (Run No. 5), observed by using the scanning type electron microscope, are shown in FIG. 2 (200× magnification), FIG. 3 (2,000× magnification) and FIG. 4 (in cross-section, 3,000× magnification).

EXAMPLE 2

Following a procedure similar to that mentioned in Example 1, drawn hollow polyester filaments were prepared wherein the amount of the sodium alkyl sulfonate mixture used was varied to 0.16, 1.61, 9.9, 27.9, 56.7 and 90.6 parts (i.e., 0.05, 0.5, 3.0, 8.0, 15.0 and 22.0%, based on the weight of the resulting polyester), with all other conditions remaining substantially the same. When the amount of the sodium alkyl sulfonate mixture used was 15.0% and 22.0%, the filaments were liable to become fluffy in the melt spinning and drawing steps.

Particularly, when the amount of the sodium alkyl sulfonate mixture was 22.0%, filament breakage was observed to a considerable extent in the melt spinning step.

Each of the drawn filaments prepared by using 0.05, 0.5, 3.0, 8.0 and 15.0% of the sodium alkyl sulfonate mixture was cut into a length of 3 mm, and then, immersed in an aqueous sodium hydroxide solution having a concentration of 20 g/liter and maintained at a temperature of 98±1° C. for 60 minutes. Then, the alkali-treated filaments were beaten to obtain a pulp. A synthetic paper was manufactured from the pulp. The conditions under which the pulp and the paper were manufactured were similar to those employed in Example 1.

Properties of the pulp and the paper are shown in Table II, below. In the above-mentioned process for the manufacture of paper, no problems were encountered with any of the pulps. However, the pulps prepared with small amounts (i.e., 0.05% and 0.5%) of the sodium alkyl sulfonate mixture had an undesirably large diameter and, particularly, the pulp prepared with 0.05% of the sodium alkyl sulfonate mixture resulted in a paper of poor tensile strength. In contrast, the pulps prepared with large amounts (i.e., 15.0% and 22.0%) of the sodium alkyl sulfonate mixture exhibited a poor yield and resulted in papers of poor tensile strength. The pulps prepared with 3% and 8% of the sodium alkyl sulfonate mixture were the most satisfactory in both their yields and the tensile strength of the resultant paper.

TABLE II

| Run No. | Amount of Na alkyl Sulfonate (%) | Period of immersion in aq. alkali solution (min.) | Yield (%) | Freeness of pulp (CC) | Average fiber diameter of pulp (microns) | Tensile strength of paper (Kg/mm²) |
|---|---|---|---|---|---|---|
| 1 | 0.05 | 60 | 90 | 690 | 8.2 | 1.0 |
| 2 | 0.5 | 60 | 77 | 510 | 5.5 | 3.1 |
| 3 | 3.0 | 60 | 38 | 320 | 1.5 | 5.5 |
| 4 | 8.0 | 60 | 20 | 198 | 0.6 | 3.3 |
| 5 | 15.0 | 60 | 9 | 150 | 0.3 | 1.9 |
| 6 | 22.0 | 60 | 5 | 132 | 0.2 | 0.7 |

EXAMPLE 3

Following a procedure similar to that mentioned in Example 1, the mixed polymer was melt-spun into filaments followed by drawing the filaments, wherein spinnerets having horse-shoe-shaped slits of various widths and diameters, and a spinneret having round orifices, were used to obtain a four type hollow filament bundle, each filament having hollow percentages of 3%, 6%, 25%, and 34%, respectively, and a non-hollow filament bundle. All other conditions remained substantially the same. Each filament bundle was comprised of 36 filaments and had a total fineness of 70 denier after the drawing. The respective filament bundles were made into pulps and, then, into papers under conditions similar to those employed in Example 2.

Properties of the resultant pulps and papers are shown in Table III, below. The pulps and papers manufactured from the hollow filaments having hollow percentages of 25% and 34% were the most satisfactory in average fiber diameter, freeness, adaptability to paper manufacture and paper strength.

TABLE III

| Run No. | Hollow percentage (%) | Period of immersion in aq. alkali solution (min.) | Yield (%) | Freeness of pulp (CC) | Average fiber diameter of pulp (microns) | Tensile strength of paper (Kg/mm²) |
|---|---|---|---|---|---|---|
| 1 | 0 | 60 | 95 | 695 | 9.4 | 0.8 |
| 2 |  | 60 | 84 | 585 | 7.7 | 2.0 |
| 3 |  | 60 | 69 | 459 | 4.4 | 3.1 |
| 4 | 29 | 60 | 38 | 320 | 1.5 | 5.5 |
| 5 | 34 | 60 | 34 | 254 | 0.8 | 5.3 |

EXAMPLE 4

A reactor equipped with a stirrer and a fractionating column, and heated by a heating medium at a temperature of 250° C., was charged with 152 parts of bis-β-hydroxyethyl-2,6-naphthalate containing 0.4% by mole of diethylene glycol, and further containing, per mole of the naphthalenedicarboxylic acid ingredient used, 0.05% by mole of lithium acetate and 0.03% by mole of antimony trioxide. When the temperature of the content reached 225° C., the reactor was charged with nitrogen, and then, 108 parts of 2,6-naphthalenedicarboxylic acid, 62 parts of ethylene glycol, 0.051 part of lithium acetate and 0.050 part of antimony trioxide were added to the content. Upon the addition of these ingredients, the temperature of the content dropped to 208° C. and the distillation of water was initiated. Thereafter, the temperature rose gradually. When the temperature reached 218° C., which occurred when 375 minutes has elapsed after the addition of the above-mentioned ingredients, the reaction was ceased.

0.041 part of phosphorous acid was added to the obtained reaction mixture, and then, while the reaction mixture was stirred in a heating bath maintained at a temperature of 285° C., the inner pressure of the reactor was maintained at normal pressure for 10 minutes, and then, gradually reduced to 3 mmHg for 60 minutes, and further, maintained at a pressure below 3 mmHg for 15 minutes, to effect the polycondensation. Then, the inner pressure was raised to ambient pressure and 15 parts of sodium dodecylbenzenesulfonate were added to the reaction mixture. Again, the inner pressure was reduced to continue the polycondensation for 35 minutes. The obtained polymer had an intrinsic viscosity of 0.61, as measured in o-chlorophenol at 35° C. The polymer was shaped into chips and, then, dried. The solubility parameters of the polyethylene-2,6-naphthalate and the sodium dodecylbenzenesulfonate were 10.9 cal$^{\frac{1}{2}}$/cm$^{3/2}$ and larger than 15 cal$^{\frac{1}{2}}$/cm$^{3/2}$, respectively.

The dried chips were melt-spun through a spinneret, having horse-shoe-shaped slits, into filaments, followed by drawing the filaments to obtain a bundle of 36 hollow filaments having a total fineness of 75 deniers. The hollow percentage of each filament was 30%. The drawn filaments were cut into 3 mm lengths. The cut filaments were treated with an aqueous sodium hydroxide solution having a concentration of 30 g/liter, at a temperature of 98±1° C., for 60 minutes. The alkali-treated filaments were beaten and made into a paper in a manner similar to that mentioned in Example 1. The final pressing of the paper was carried out at a temperature of 210° C. and a pressure of 200 Kg/cm² for three minutes.

The pulp exhibited an average fiber diameter of 2.9 microns and a freeness of 380 cc, and no problems were encountered in the manufacture of the paper therefrom. The paper had a tensile strength of 5.7 Kg/mm$^2$.

EXAMPLE 5

Polyethylene isophthalate having an intrinsic viscosity of 0.55, as measured in o-chlorophenol at 35° C., was metered by using a gear pump at a temperature of 295° C. and introduced into the mixing part of a screw extruder, maintained at a temperature of 285° C. A sodium alkyl sulfonate mixture, having alkyl groups which contained an average of 14 carbon atoms and the number of carbon atoms in each of which ranged from 8 to 20, was metered by using a gear pump at a temperature of 130° C. and introduced into the above-mentioned mixing part of the screw extruder. The amount of the sodium alkyl sulfonate mixture was 3% by weight based on the weight of the polyethylene isophthalate. A mixture of the polyethylene isophthalate and the sodium alkyl sulfonate mixture was melt-extruded through the screw extruder into hollow filaments, followed by drawing the filaments in a conventional manner, to obtain a bundle of 36 filaments having a total fineness of 75 deniers, each filaments having a hollow percentage of 25%. The drawn filaments were cut into short lengths, treated with an aqueous alkali solution, heaten and, then, made into a paper in a manner similar to that mentioned in Example 4.

The pulp exhibited an average fiber diameter of 2.4 microns and a freeness of 325 cc, and no problems were encountered in the manufacture of the paper therefrom. The paper had a tensile strength of 5.0 kg/mm$^2$.

EXAMPLE 6

Dimethyl terephthalate, having incorporated therewith 0.25% by mole of sodium 3,5-di(carbomethoxy)-benzenesulfonate, was polycondensed with an equimolar amount of ethylene glycol to obtain a copolyester having an intrinsic viscosity of 0.58, as measured in o-chlorophenol at 35° C. A finely divided powder of the copolyester was mixed with 3%, based on the weight of the copolyester, of a sodium alkyl sulfonate mixture having alkyl groups which contained an average of 14 carbon atoms and the number of carbon atoms in each of which ranged from 8 to 20. The obtained mixture was kneaded in a melt-extruder, in order to enhance the uniformity of the mixture, and the extrudate from the extruder was made into chips and, then, dried.

The dried chips were melt-spun into filaments, and the filaments were subjected to doubling, drawing, crimping and heat-setting by a conventional procedure, to obtain a tow having a total fineness of 170,000 denier. Each filament had a fineness of 2 denier and a hollow percentage of 25%. The tow was cut by using a rotational gear cutter into 5 mm lengths. The cut filaments were immersed in an aqueous sodium hydroxide solution, having a concentration of 20 g/liter, at a temperature of 98±1° C. and at a bath ratio of 1:100, under agitation, for a predetermined period of time. The alkali-treated filaments were washed with water and, then, dried. After that, the filaments were dispersed in water at a concentration of 0.5%, and, then, beaten by using a high concentration disk refiner (supplied by Kumagaya Riki Kogyo K.K., Japan) provided with a disintegrating plate (supplied by the same company) at a plate gap of 2/100 mm. The beating was then repeated four more times. The obtained pulp was made into paper in a manner similar to that mentioned in Example 1.

Properties of the pulp and the paper are shown in Table IV, below. No problems were encountered with the pulp during in the manufacture of the paper therefrom.

TABLE IV

| Run No. | Period of immersion in aq, alkali solution (min.) | Yield (%) | Freeness of pulp (cc) | Average fiber diameter of pulp (microns) | Tensile strength of paper (kg/mm$^2$) |
|---|---|---|---|---|---|
| 1 | 20 | 66 | 375 | 2.6 | 4.1 |
| 2 | 40 | 18 | 210 | 0.9 | 3.5 |

EXAMPLE 7

Drawn polyethylene terephthalate filaments similar to those obtained in Example 1 and prepared with 3% of the sodium alkyl sulfonate mixture were cut into a length of 3 mm. The cut filaments were immersed in an aqueous 40% monomethylamine solution, at room temperature, under agitation, for 30 minutes, and then, immersed in an aqueous sodium hydroxide solution in a manner similar to that employed in Example 1. The alkali-treated filaments were beaten and made into paper, and finally, pressed in a manner similar to that employed in Example 1.

Figure 5:
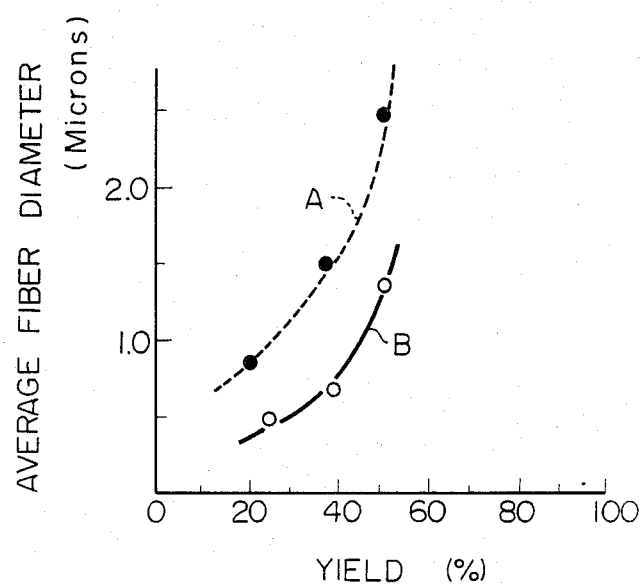
FIG. 5 shows graphs illustrating the dependence of the yield (%) of the pulp upon the average fiber diameter (microns) of the pulp.

Properties of the pulp and the paper are shown in Table V, below. The dependence of the yield upon the average fiber diameter, obtained from the data given in Table V, is illustrated by a curve B in FIG. 5. For comparison purposes, the dependence of the yield upon the average fiber diameter, obtained from the data of Run Nos. 1, 2 and 3, in Table I of Example 1, is illustrated by a curve A in FIG. 5. As is seen from a comparison of the curve B with the curve A, the combined use of an aqueous amine solution and an aqueous sodium hydroxide solution results in yields of the pulp better than those obtained by the single use of an aqueous sodium hydroxide solution.

TABLE V

| Run No. | Period of immersion in aq, alkali solution (min.) | Yield (%) | Freeness of pulp (cc) | Average fiber diameter of pulp (microns) | Tensile strength of paper (kg/mm$^2$) |
|---|---|---|---|---|---|
| 1 | 30 | 55 | 310 | 1.4 | 4.5 |
| 2 | 45 | 40 | 220 | 0.7 | 4.4 |
| 3 | 60 | 25 | 155 | 0.5 | 3.8 |

EXAMPLES 8 THROUGH 13

A mixture of 100 parts of dimethyl terephthalate, 70 parts of ethylene glycol and 0.025 part of manganese acetate was maintained at a temperature of 230° C., under agitation, for 90 minutes, while methanol was distilled off from the reaction mixture to effect interesterification. 0.015 part of phosphorus acid as a stabilizer and 0.041 part of antimony trioxide were added to the reaction mixture. The resultant mixture was heated to a temperature of 285° C., and maintained at that temperature, under a subatmospheric pressure, for 30 minutes, and then, under a pressure of 0.5 mmHg for 80 minutes to effect polycondensation.

In the middle stage of the above-mentioned polycondensation, polyoxyethylene glycol having an average molecular weight of 20,000 and a sodium alkyl sulfonate mixture, having alkyl groups which contained an average of 14 carbon atoms and the number of carbon atoms in each of which ranged from 8 to 20, were added to the reaction mixture. The amounts of the polyoxyethylene glycol and the sodium alkyl sulfonate mixture are shown in Table VI, below. The polyethylene terephthalate, the polyoxyethylene glycol and the sodium alkyl sulfonate mixture had solubility parameters of 10.7 cal$^{1/2}$/cm$^{3/2}$, 11.9 cal$^{1/2}$/cm$^{3/2}$ and larger than 15 cal$^{1/2}$/cm$^{3/2}$, respectively. Therefore, $|SP_{c1}-SP_e| \geq 4.3$ and $|SP_{c2}-SP_e| = 1.2$.

The mixed polymer, so obtained, was extruded and cut into chips and, then, dried. The dried chips were melt-spun through a spinneret having horse-shoe-shaped slits of 0.05 mm in width and 0.6 mm in diameter by a conventional procedure to obtain a bundle of hollow filaments, each filament having a hollow percentage of 25%. The hollow filaments were subjected to doubling, drawing, crimping and heat-setting by a conventional procedure to obtain a tow having a total fineness of 170,000 denier. Each filament had a fineness of 2.6 denier. The tow was cut by using a rotational gear cutter into 5 mm lengths. The cut filaments were immersed in an aqueous sodium hydroxide solution having a concentration of 30 g/liter, at a temperature of 98±1° C. and at a bath ratio of 1:100, under agitation, for a predetermined period of time. The alkali-treated filaments were washed with water and, then, dried. The filaments were dispersed in one liter of water and, then, beaten by using a home mixer MX-820G for 30 minutes to obtain a polyester synthetic pulp. The average fiber diameter and freeness of the pulp are shown in Table VI, below. The pulp was dispersed in water at a concentration of 2.2 g/7.9 liters. A paper was manufactured from the aqueous dispersion of the synthetic pulp by using a TAPPI standard sheeting machine supplied by Toyo Seiki K.K., Japan. The obtained wet sheet was dried and, then, pressed under a pressure of 200 kg/cm$^2$, at a temperature of 200° C., for three minutes, to obtain a polyester synthetic paper.

The above-mentioned procedure was repeated wherein the sodium alkyl sulfonate mixture was added to the polycondensation mixture instead of the combination of the polyoxyethylene glycol with the sodium alkyl sulfonate mixture. Properties of the pulps and the papers are shown in Table VI, below.

those of pulp and paper obtained with the single use of the sodium alkyl sulfonate (Examples 11, 12 and 13).

Figure 6:
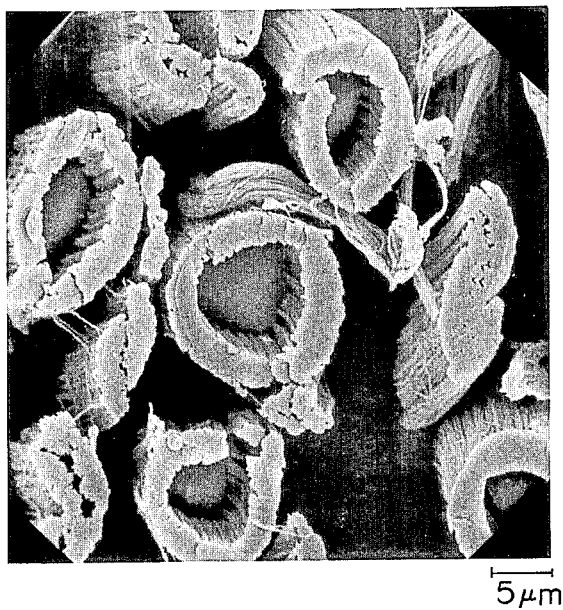
FIG. 6 is a photograph of the cross-section of the alkali-treated filaments, observed by using a scanning type electron microscope at a magnification of 2,000X.
Figure 7:
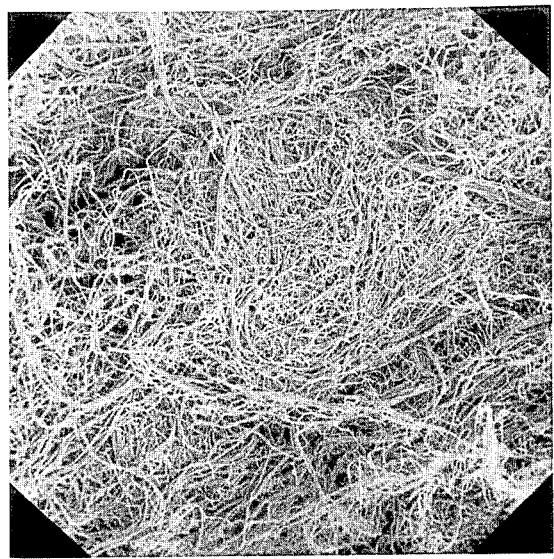
FIGS. 7 and 8 are photographs of the beaten filaments, observed by using a scanning type electron microscope at magnifications of 200X and 2,000X, respectively.
Figure 8:
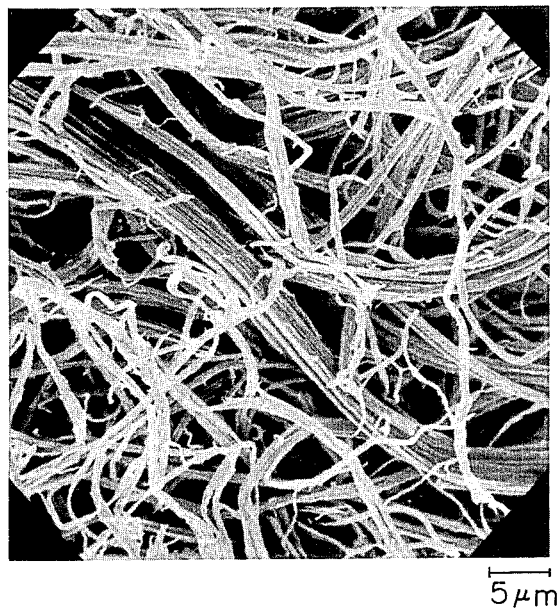

A photograph of the cross-section of the filaments (in Example 9) after the aqueous alkali treatment, observed by using a scanning type electron microscope (2,000× magnification) is shown in FIG. 6. Photographs of the beaten filaments (in Example 9), observed by using the scanning type electron microscope, are shown in FIG. 7 (200× magnification) and FIG. 8 (2,000× magnification).

EXAMPLE 14

Polyethylene terephthalate having an intrinsic viscosity of 0.65, as measured in o-chlorophenol at 35° C., was metered by using a gear pump at a temperature of 295° C. and introduced into the mixing part of a screw extruder, maintained at a temperature of 285° C. A sodium alkyl sulfonate mixture, similar to that used in Example 1, was metered by using a gear pump at a temperature of 130° C. and introduced into the above-mentioned mixing part of the screw extruder. The amount of the sodium alkyl sulfonate mixture was 4% by weight based on the weight of the polyethylene terephthalate. A mixture of the polyethylene terephthalate and the sodium alkyl sulfonate mixture was melt-extruded through the screw extruder, and the extrudate was cut into chips and, then, dried. The dried chips were melt-spun through a spinneret having horse-shoe-shaped slits by a conventional procedure to obtain a bundle of hollow filaments, each filament having a hollow percentage of 25%. The hollow filaments were subjected to doubling, drawing and heat-setting by a conventional procedure to obtain a tow having a total fineness of 170,000 denier. The tow was cut by using a rotational gear cutter into 0.5 mm and 3 mm lengths. The cut filaments were immersed in an aqueous sodium hydroxide solution havng a concentration of 30 g/liter, at a temperature of 98±° C. and at a bath ratio of 1:100, under agitation, for a predetermined period of time. The alkali-treated filaments were washed with water and, then, dried. The filaments were dispersed in water at a concentration of 1% and, then, beaten by using a disc-refiner supplied by Kumagaya Riki K.K. to obtain a polyester synthetic pulp. Its average fiber diameter and freeness are shown in Table VII, below. The pulp was

TABLE VI

|  | Organic compound added and its amount (wt. %)* | Period of immersion in aq, alkali solution (min.) | Yield (%) | Freeness of pulp (cc) | Average fiber diameter (micron) | Tensile strength of paper (kg/mm$^2$) |
| --- | --- | --- | --- | --- | --- | --- |
| Example 8 | SAG(2) + POEG(4) | 20 | 70 | 323 | 1.5 | 5.3 |
| Example 9 | " | 32 | 50 | 210 | 0.7 | 5.3 |
| Example 10 | " | 40 | 30 | 180 | 0.4 | 5.0 |
| Example 11 | SAS(6) | 15 | 70 | 560 | 8.5 | 1.9 |
| Example 12 | " | 25 | 50 | 411 | 3.5 | 3.0 |
| Example 13 | " | 35 | 30 | 300 | 1.3 | 5.1 |

*SAS = Sodium alkyl sulfonate mixture
POEG = Polyoxyethylene glycol

As is seen from Table VI, the combined use of the polyoxyethylene glycol and the sodium alkyl sulfonate (Examples 8, 9 and 10) results in pulp exhibiting smaller freeness and smaller average fiber diameter and in paper exhibiting larger tensile strength, as compared with dispersed in water a concentration of 2.2 g/7.9 liters. A paper was manufactured in a manner similar to that mentioned in Example 1. The obtained wet sheet was dried and, then, pressed under a pressure of 200 kg/cm$^2$, at a temperature of 200° C., for one minute to obtain a polyester synthetic paper.

TABLE VII

| Run No. | Fineness of single filament | Length of cut filaments (mm) | Period of immersion in aq, alkali solution (min.) | Yield (%) | Average fiber diameter (micron) | Variance in fiber diameter | Freeness of pulp (cc) | Branches of fibrils | Adaptability to paper making | Tensile strength of paper (kg/mm²) |
|---|---|---|---|---|---|---|---|---|---|---|
| 1* | 1.3 | 0.5 | 73 | 6.5 | 0.08 | 0.21 | 45 | No | Poor | 1.5 |
| 2* | 1.3 | 0.5 | 65 | 13 | 0.25 | 0.28 | 70 | No | Poor | 2.4 |
| 3 | 1.3 | 0.5 | 40 | 27 | 0.51 | 0.33 | 151 | Yes | Good | 5.9 |
| 4 | 1.3 | 3.0 | 27 | 63 | 5.0 | 0.34 | 521 | Yes | Good | 6.7 |
| 5* | 1.3 | 3.0 | 7 | 95 | 10.3 | 0.58 | 710 | Yes | Poor | — |
| 6 | 5.0 | 3.0 | 78 | 15 | 0.23 | 0.31 | 75 | Yes | Good | 2.9 |
| 7 | 5.0 | 3.0 | 65 | 21 | 0.56 | 0.49 | 165 | Yes | Good | 6.3 |
| 8 | 5.0 | 3.0 | 21 | 61 | 2.2 | 0.52 | 305 | Yes | Good | 7.5 |
| 9 | 5.0 | 3.0 | 12.5 | 83 | 4.9 | 0.73 | 556 | Yes | Good | 6.4 |
| 10 | 5.0 | 3.0 | 9.0 | 87 | 10.2 | 0.77 | 682 | Yes | Fairly good | 3.6 |
| 11* | 5.0 | 3.0 | 5.0 | 94 | 12.5 | 0.81 | 715 | Yes | Poor | — |

*Comparative examples

The pulp specimen No. 1 could be processed only at an extremely low rate when it is processed in a cylinder or wire paper machine. When the pulp specimens No. 5 and 11 are processed, a wet sheet could not smoothly be separated from the wire.

EXAMPLE 15

Each of the polyester pulps No. 3, 4, 7, 9 and 10, obtained in Example 14, was dispersed in water to prepare an aqueous pulp slurry having a concentration of 1 g/7.9 liters. A handmade sheet was prepared by the same procedure as mentioned in Example 1, except that the weight of couch roller was 2 kg instead of 13 kg and the pressing procedure was omitted. The obtained sheet was a bulky non-woven fabric having a basis weight of 55 g/m² and a thickness of 0.8 mm.

Performance of the non-woven fabric as an aerosol filter was evaluated by filtering an aerosol containing dioctyl phthalate particles having a center diameter of 0.3 micron at a concentration of about 600,000 particles/liter through the non-woven fabric at a linear velocity of 4.75 cm/sec. The evaluation results are shown in Table VIII, below.

TABLE VIII

| Run No. | Average fiber diameter (microns) | Variance in fiber diameter ($\sigma$) | Pressure drop (Pa) | Permeability* to 0.3 m$\mu$ DOP |
|---|---|---|---|---|
| 3 | 0.51 | 0.33 | 350 | $3.1 \times 10^{-5}$ |
| 7 | 0.56 | 0.49 | 392 | $8.6 \times 10^{-5}$ |
| 4 | 5.0 | 0.34 | 91 | $2.0 \times 10^{-2}$ |
| 9 | 4.9 | 0.73 | 112 | $2.5 \times 10^{-1}$ |
| 10 | 10.2 | 0.77 | 35 | $6.8 \times 10^{-1}$ |

*The permeability to 0.3 micron DOP was determined as follows. Dioctyl phthalate having a predominant particle size of 0.3 micron was produced, and passed through the specimen filter at a linear velocity of 4.75 cm/sec. Predetermined volumes of air were collected from the parts upstream and downstream from the specimen filter, and, the number of dioctyl phthalate particles present in the collected air was counted by 4,100 type multi-dust counter supplied by DAN-KAGAKU K.K. The permeability was calculated from the equation:

$$\text{Permeability (Co/Ci)} = \frac{\text{Number of DOP particles on downstream side per liter}}{\text{Number of DOP particles on upstream side per liter}}$$

The non-woven fabric from pulp No. 10 having an average fiber diameter of 10.2 microns exhibited too low a collection efficiency to be used as an aerosol filter. Although the non-woven fabrics from pulp No. 3 and No. 4 have average fiber diameters similar to those from pulp No. 7 and No. 9, respectively, the non-woven fabrics made of pulp No. 7 and No. 9, exhibiting enhanced variance in fiber diameter, had large pressure drops (Pa) and were not satisfactory in collection efficiency. Particularly, the non-woven fabric of pulp No. 9 is not suitable for an aerosol filter.

COMPARATIVE EXAMPLE 1

35 parts of polyethylene terephthalate having an intrinsic viscosity of 0.65 as measured in o-chlorophenol at 35° C. and 65 parts of polyhexamethylene adipamide having an intrinsic viscosity of 1.15 as measured in m-cresol at 35° C. were independently metered at a temperature of 295° C., and introduced into the mixing part of a melt extruder. The extrudate was cut into chips and, then, dried. The dried chips were melt-spun into filaments, and then, the filaments are doubled, drawn and heat-set by a conventional procedure to obtain a tow having a total fineness of 150,000 denier, the single filament fineness being 3 denier. The tow was cut by using a guillotine cutter into 3 mm lengths. The cut tow was immersed in formic acid whereby the polyhexamethylene adipamide was dissolved therein. The so obtained slurry of polyethylene terephthalate in formic acid was treated with water whereby the formic acid medium was gradually replaced by water.

The polyethylene terephthalate pulp contained in the obtained aqueous slurry proved through the observation of electron microphotographs to be comprised of fibrils which had smooth surfaces and approximately round cross-sectional shapes and had no branches. The freeness, the average fiber diameter and the variance in fiber diameter were 482 cc, 4.6 microns and 0.68, respectively. When the pulp was used for papermaking, the wet web could not smoothly be separated from the wire part of a sheet machine, i.e., a minor part of the wet web remained in the wire part. Namely, although the pulp had a good freeness which is similar to that of Run No. 9 in Example 14, the pulp exhibited poor adaptability to papermaking. It is presumed that this is because the fibrils of the pulp have smooth surfaces and approximately round cross-sectional shapes and further have no branches.

EXAMPLE 16

Following a procedure similar to that mentioned in Example 14, undrawn polyethylene terephthalate filaments each having a fineness of 5.0 denier and drawn and heat-set polyethylene terephthalate filaments each having a fineness of 5.0 denier were proposed. The undrawn filaments and the drawn-and-heat-set filaments were separately cut into short lengths, alkali-treated, washed with water, beaten and, then, made into papers by a procedure similar to that employed in Example 14. The final hot pressing of the papers was carried out at a temperature of 160° C. or 200° C.

The tensile strength and elongation (E) of the papers, are shown in Table IX, below. The elongation (E') of the papers was further measured after the papers was maintained in dry air at a temperature of 180° C. for 100 hours and for 1,000 hours. Thus, the elongation retention was calculated from the equation:

Elongation retention (%) = (E'/E) × 100

The results are shown in Table IX, below.

TABLE IX

| Run No. | Filaments used | Period of immersion in aq, alkali solution (min.) | Yield (%) | Freeness of pulp (cc) | Degree of crystallinity (%) | Hot pressing Temp. (°C.) | Tensile strength of paper (kg/mm²) | Elongation (%) | Elongation retention (%) 100 hrs. after | Elongation retention (%) 1,000 hrs. after |
|---|---|---|---|---|---|---|---|---|---|---|
| 1* | Undrawn | 19 | 55 | 296 | 22 | 160 | 2.1 | 11.7 | 27 | 4 |
| 2* | " | 19 | 55 | 296 | 22 | 200 | 5.2 | 18.3 | 36 | 13 |
| 3 | Drawn and heat-set | 21 | 61 | 305 | 31 | 160 | 3.8 | 7.3 | 81 | 45 |
| 4 | Drawn and heat-set | 21 | 61 | 305 | 31 | 200 | 7.5 | 12.5 | 96 | 51 |

*Comparative examples

As is seen from a comparison of Run No. 1 with Run No. 3 and a comparison of Run No. 2 with Run No. 4, the papers resulting from pulps having high degree of crystallinity exihibits enhanced tensile strength and good elongation retentions. This means that the high degree of crystallinity of pulp is crucial for thermally resistant papers.

EXAMPLE 17

Polyethylene terephthalate having an intrinsic viscosity of 0.62, as measured in o-chlorophenol at 35° C. was metered by using a gear pump at a temperature of 295° C. and introduced into the mixing part of a screw extruder, maintained at a temperature of 285° C. A mixture of polyoxyethylene glycol and a sodium alkyl sulfonate mixture, similar to that used in EXAMPLE 1, was metered by using a gear pump at a temperature of 130° C. and introduced into the above-mentioned mixing part of the screw extruder. The amounts of the polyoxyethylene glycol and the sodium alkyl sulfonate mixture are shown in Table X, below. For a comparison purpose, two types of polyoxyethylene glycol were separately used, one of which had a molecular weight range of from about 100,000 to about 150,000 and an average molecular weight of about 130,000, and the other of which had an average molecular weight of about 20,000. The polyethylene terephthalate having incorporated therewith the mixture of the polyoxyethylene glycol and the sodium alkyl sulfonate mixture, was melt-extruded through the screw extruder equipped with a spinneret having horseshoe-shaped slits to obtain hollow filaments. The hollow filaments are drawn in a conventional manner to obtain a bundle of filaments, each filament having a fineness of 1.8 denier and a hollow percentage of 8%. The drawn filaments were cut into 5 mm lengths, and then, 20 g of the cut filaments were immersed in 2 liters of an aqueous sodium hydroxide solution having a concentration of 15 g/liter and maintained at 98°±1° C., under agitation. The alkali-treated filaments were beaten and then made into a paper in a manner similar to that mentioned in Example 1.

Properties of the pulp and the paper are shown in Table X, below.

TABLE X

| Run No. | Organic compound added and amount thereof (wt. %)*1 | Period of immersion in aq. alkali solution (min.) | Yield (%) | Freeness of pulp (cc) | Average fiber diameter of pulp (microns) | Tensile strength of paper (kg/mm²) |
|---|---|---|---|---|---|---|
| 1 | SAS (4) + POEG.13 (8) | 6 | 96 | 330 | 1.2 | 5.2 |
| 2 | SAS (4) + POEG.13 (8) | 12 | 89 | 188 | 0.5 | 5.1 |
| 3 | SAS (4) + POEG.13 (8) | 28 | 62 | 150 | 0.3 | 5.1 |
| 4 | SAS (4) + POEG.6 (7) | 6 | 95 | 410 | 1.9 | 4.9 |
| 5 | SAS (4) + POEG.6 (7) | 12 | 87 | 285 | 0.8 | 5.2 |
| 6 | SAS (4) + POEG.6 (7) | 28 | 60 | 210 | 0.5 | 5.3 |
| 7 | SAS (4) + POEG.2 (8) | 6 | 95 | 535 | 5.0 | 3.8 |
| 8 | SAS (4) + POEG.2 (8) | 12 | 88 | 350 | 2.0 | 4.3 |
| 9 | SAS (4) + POEG.2 (8) | 28 | 61 | 320 | 1.1 | 4.7 |
| 10 | SAS (8) | 28 | 70 | 590 | 6.5 | 1.2 |
| 11 | SAS (4) + POEG.4 (7) | 6 | 94 | 515 | 4.1 | 3.5 |
| 12 | SAS (4) + | 28 | 60 | 305 | 1.5 | 3.9 |

TABLE X-continued

| Run No. | Organic compound added and amount thereof (wt. %)*1 | Period of immersion in aq. alkali solution (min.) | Yield (%) | Freeness of pulp (cc) | Average fiber diameter of pulp (microns) | Tensile strength of paper (kg/mm²) |
| --- | --- | --- | --- | --- | --- | --- |
| | POEG.4 (7) | | | | | |

*1 SAS = Sodium alkyl sulfonate mixture
POEG 13, POEG 6, POEG 2, POEG 4 = Polyoxyethylene glycols having average molecular weights of about 130,000, about 60,000, about 20,000 and 40,000, respectively The pulps (Run Nos. 1, 2 and 3) prepared with a mixture of the sodium alkyl sulfonate with polyoxyethylene glycol of an average molecular weight of about 130,000 were advantageous over those (Run Nos. 4, 5, and 6) prepared with a mixture of the sodium alkyl sulfonate with polyoxyethylene glycol of an average molecular weight of about 20,000, in that the former was obtained at a higher yield and comprised of more uniform fibrils which could be easily dispersed in water with little or no nep formation.

EXAMPLE 18

Following a procedure similar to that mentioned in Example 1, chips of polyethylene terephthalate mixed with the sodium alkyl sulfonate were prepared. The chips were dried and, then, a part of the chips were melt-spun through a spinneret having horse-shoe-shaped slits by a conventional procedure to obtain hollow filaments. The hollow filaments were drawn 4.2 times their original length. The other part of the dried chips were melt-spun through a spinneret having linear slits by a conventional procedure to obtain flat filaments. The flat filaments were drawn 3.5 times their original length. The fineness, the hollow percentage or flatness ratio and the wall thickness, of the hollow and flat filaments are shown in Table XI, below.

The respective drawn filaments were doubled and, then, cut into 3 mm lengths by using a guillotine cutter. 20 g of the obtained staple fibers were immersed in 2 liters of an aqueous sodium hydroxide solution having a concentration of 30 g/liter and maintained at a temperature of 98°±1° C., under agitation for a predetermined period of time. The alkali-treated staple fibers were washed with water and, then, dried. Thereafter, the staple fibers were dispersed in one liter of water and, then, beaten by using a home mixer MX-820G for 30 minutes to obtain a synthetic polyester pulp.

The yield, average fiber diameter, freeness and variance in fiber diameter of the pulp are shown in Table XI, below.

As is seen from Table XI, the fibers having a wall thickness of not more than 6 microns result in pulps having a small average fiber diameter and exhibiting an extremely small variance in fiber diameter, although the pulps are obtained at a relatively high yield (refer to Run Nos. 1 through 8). In contrast, the fibers having a wall thickness of more than 6 microns result in pulps exhibiting a large variance in fiber diameter, and the yield of the pulps is lower (refer to Run Nos. 9 through 14) than that of the pulps having approximately the same fiber diameter and prepared from the fibers with thinner wall thickness.

TABLE XI

| Run No. | Fineness (denier) | Hollow percentage (H: %) or flatness ratio (F) | Wall thickness (microns) | Period of immersion in aq. alkali solution (min.) | Yield (%) | Freeness of pulp (cc) | Average fiber diameter of pulp (microns) | Variance in fiber diameter ($\sigma$) |
| --- | --- | --- | --- | --- | --- | --- | --- | --- |
| 1 | 1.3 | H 25% | 3.3 | 18 | 60 | 316 | 1.02 | 0.31 |
| 2 | 1.3 | H 25% | 3.3 | 25 | 45 | 230 | 0.65 | 0.23 |
| 3 | 2.0 | F 14.7 | 3.3 | 18 | 56 | 311 | 0.82 | 0.28 |
| 4 | 2.0 | F 14.7 | 3.3 | 25 | 40 | 217 | 0.61 | 0.21 |
| 5 | 3.0 | H 20% | 5.5 | 25 | 52 | 350 | 1.66 | 0.48 |
| 6 | 3.0 | H 20% | 5.5 | 40 | 32 | 234 | 0.95 | 0.42 |
| 7 | 3.0 | F 8.0 | 5.5 | 23 | 53 | 370 | 1.55 | 0.45 |
| 8 | 3.0 | F 8.0 | 5.5 | 35 | 32 | 251 | 1.16 | 0.39 |
| 9 | 5.0 | H 19.7% | 7.0 | 30 | 48 | 431 | 3.12 | 0.68 |
| 10 | 5.0 | H 19.7% | 7.0 | 48 | 30 | 325 | 2.04 | 0.56 |
| 11 | 5.0 | H 19.7% | 7.0 | 65 | 19 | 242 | 1.37 | 0.49 |
| 12 | 5.2 | F 8.3 | 7.1 | 26 | 53 | 480 | 2.96 | 0.71 |
| 13 | 5.2 | F 8.3 | 7.1 | 49 | 25 | 326 | 1.95 | 0.59 |
| 14 | 5.2 | F 8.3 | 7.1 | 60 | 17 | 220 | 1.18 | 0.52 |

EXAMPLE 19

Following a procedure similar to that mentioned in Example 1, a bundle of hollow drawn filaments were prepared, each of which filaments had a fineness of 3.2 denier and a hollow percentage of 32%. A plurality of the filament bundles were collected together and cut by using a guillotine cutter into 3 mm lengths. The staple fibers, so obtained, were heat-treated at a predetermined temperature (shown in Table XII, below) for one hour by using a hot air dryer. The softening points of the polyethylene terephthalate and the sodium alkyl sulfonate mixture were 253° C. and 90° C., respectively. 20 g of the heat-treated staple fibers were immersed in two liters of an aqueous sodium hydroxide solution having a concentration of 30 g/liter and maintained at a temperature of 98±1° C., under agitation, for a predetermined period of time. The alkali-treated staple fibers were washed with water and, then, dried. An electron microphotograph (2,000×) of the cross-section of the staple fibers is shown in FIG. 9. Thereafter, the staple fibers were dispersed in one liter of water and, then, beaten by using a home mixer MX-820G for 30 minutes to obtain a synthetic polyester pulp. The yield, average fiber diameter, variance in fiber diameter and freeness of the pulp are shown in Table XII, below. A paper was manufactured from an aqueous dispersion of the pulp and the paper was hot-pressed, in a manner similar to that mentioned in Example 1. The tensile strength of the paper is shown in Table XII, below.

TABLE XII

| Run No. | Heat treatment Temp. and time | Period of immersion in aq. alkali solution (min.) | Yield (%) | Freeness of pulp (cc) | Average fiber diameter of pulp (microns) | Variance in fiber diameter ($\sigma$) | Tensile strength of paper (kg/mm$^2$) |
|---|---|---|---|---|---|---|---|
| 1 | 120° C. | 35 | 55 | 375 | 1.5 | 0.38 | 5.9 |
| 2 | 1 hr | 45 | 41 | 275 | 1.0 | 0.32 | 5.3 |
| 3 | 180° C. | 20 | 55 | 305 | 1.1 | 0.25 | 5.4 |
| 4 | 1 hr | 32 | 40 | 230 | 0.8 | 0.20 | 5.5 |
| 5 | 230° C. | 15 | 56 | 250 | 0.9 | 0.27 | 5.0 |
| 6 | 1 hr | 29 | 43 | 200 | 0.7 | 0.21 | 4.9 |
| 7 | 100° C. | 65 | 55 | 450 | 3.0 | 0.68 | 4.5 |
| 8 | 1 hr | 85 | 35 | 355 | 1.8 | 0.61 | 4.9 |
| 9 | 245° C., 1 hr | *1 | | | | | |

*1 The fibers were partially melt-adhered to each other.

As is seen from Table XII, when the heat-treating temperature is too low (Run Nos. 7 and 8), a substantially long period of time is necessary for the alkali treatment, and the resulting pulp has a relatively large average fiber diameter and a large variance in fiber diameter. In contrast, when the heat-treating temperature is appropriate (Run Nos. 1 through 6), the alkali-treatment can be completed within a short period of time, and the resulting pulp has a small average fiber diameter and a reduced variance in fiber diameter.

EXAMPLE 20

A glass flask equipped with a fractionating column was charged with 197 parts of dimethyl terephthalate, 124 parts of ethylene glycol and 0.118 part of calcium acetate monohydrate, followed by interesterifying the contents of the flask in a conventional manner to distil off a theoretical amount of methanol therefrom. The reaction product was placed in a polycondensation flask equipped with a fractionating column, followed by adding thereto 0.112 part of trimethyl phosphate as a stabilizer and 0.079 part of antimony trioxide as a polycondensation catalyst. The content was maintained at a temperature of 280° C., under normal pressure, for 30 minutes and, further, at that temperature, under a pressure of 30 mmHg, for 15 minutes to effect the polycondensation. After the pressure was raised to normal pressure, 13 parts of a sodium alkyl sulfonate mixture were added to the reaction mixture. The sodium alkyl sulfonate mixture used had alkyl groups, which contained an average of 14 carbon atoms and the number of carbon atoms in each of which ranged from 8 to 20. Then, the pressure within the flask was gradually reduced to 0.32 mmHg, over a period of 85 minutes, while the reaction mixture was stirred. The mixed polymer so obtained exhibited an intrinsic viscosity of 0.65, as measured in o-chlorophenol at a temperature of 35° C.

The dried chips were melt-spun through a spinneret having horse-shoe-shaped slits by a conventional procedure to obtain a bundle of hollow filaments each having a hollow percentage of 27%. A plurality of the hollow filament bundles were doubled drawn and then, heat-set in a conventional manner, to obtain a filament tow having a total fineness of 170,000 denier (single filament fineness = 1.5 denier). The filament tow was cut by using a quillotine cutter into 3 mm lengths. 50 g of the obtained staple fibers were immersed in an aqueous sodium hydroxide solution having a concentration of 30 g/liter and maintained at a temperature of 98±1° C., at a bath ratio of 1:100 under agitation, for a predetermined period of time. The alkali-treated staple fibers were washed with water and, then, dried to obtain 28.5 g of the dry fibers. Th dry fibers were divided into six batches. Three batches of the dry fibers were subjected to high temperature washing and, thereafter, beaten to be fibrillated. Three batches of the dry fibers were beaten to be fibrillated and, thereafter, subjected to high temperature washing. The high temperature washing was conducted as follows. Each batch (4.75 g) of the fibers was dispersed in 5 liters of deionized water. Thereafter, the obtained aqueous slurry was placed in a six liter volume spherical autoclave, and the slurry was heated to a predetermined washing temperature over a period of about 15 minutes. The slurry was maintained at that washing temperature for one hour while the autoclave was rotated at a rate of ten rounds per minute. The beating was conducted by dispersing each batch of the fibers in 2 liters of water and, then, beating the dispersed fibers for 30 minutes by using a home mixer MX-820G, supplied by Matsushita Denko K.K. The concentration of the polyester pulp, so obtained, was adjusted to 2.2 g/7.9 liters. A paper was made from the polyester pulp by using a TAPPI standard sheet machine supplied by Toyo Seiki K.K. The obtained wet sheet was dried and, then, hot-pressed at a temperature of 200° C. and a pressure of 200 kg/cm$^2$ to obtain synthetic polyester papers having a thickness of 100 microns and a volume fraction of fiber of 0.80. The properties of the papers are shown in Table XIII, below.

TABLE XIII

| Run No. | Washing | Washing temperature (°C.) | Na$^+$ Concentration (ppm) *1 | Change of color after heat treatment *2 | Specific permittivity *3 | Dielectric dissipation factor ($\times 10^{-3}$) *3 | | |
|---|---|---|---|---|---|---|---|---|
| | | | | | | 20° C. | 80° C. | 140° C. |
| 1 | Not conducted | — | 234 | Remarkable | 3.62 | 10.1 | 21.5 | 41.3 |
| 2 | Before | 95 | 116 | Slight | 2.78 | 6.7 | 8.4 | 31.5 |

TABLE XIII-continued

| Run No. | Washing | Washing temperature (°C.) | Na+ Concentration (ppm) *1 | Change of color after heat treatment *2 | Specific permittivity *3 | Dielectric dissipation factor (× 10⁻³) *3 | | |
|---|---|---|---|---|---|---|---|---|
| | | | | | | 20° C. | 80° C. | 140° C. |
| 3 | Before beating | 108 | 64 | Extremely Slight | 2.49 | 5.2 | 2.3 | 9.5 |
| 4 | Before beating | 130 | 33 | None | 2.53 | 3.6 | 1.6 | 6.7 |
| 5 | After beating | 95 | 107 | Slight | 2.81 | 6.2 | 7.8 | 30.8 |
| 6 | After beating | 108 | 57 | Extremely slight | 2.59 | 5.1 | 2.4 | 9.1 |
| 7 | After beating | 130 | 18 | None | 2.47 | 3.2 | 1.4 | 6.4 |
| 8 | Polyethylene terephtalate film *4 | | | | 3.15 | 4.1 | 1.9 | 10.3 |

*1 The Na+ concentration in paper was determined as follows. 2 g of a specimen was pulverized and maintained at 300° C. for 30 minutes and further at 700° C. for one hour to be thereby incinerated. The ash was dissolved in 10 ml of 30% nitric acid and filtered. The volume of the filtrate was adjusted to 50 ml, and the aqueous solution was tested for its Na+ concentration by flame analysis using an atomic-absorption spectrometer (Type 208, supplied by Hitachi Mfg. Co.).
*2 The color changed was observed after a specimen was maintained at 180° C. for 1,000 hours.
*3 The specific permittivity and the dielectric dissipation factor were determined as follows. A specimen was impregnated with a dodecylbenzene insulating oil. The specific permittivity and the dielectric dissipation factor were measured on the insulting oil-impregnated specimen by using a TR-1100 type automatic dielectric loss measuring apparatus at a temperature of 20° to 140° C.
*4 Polyethylene terephthalate film having a thickness of 100 microns and made of polyethylene terephthalate having an intrinsic viscosity of 0.62 as measured in o-chlorophenol at 35° C.

As is seen from Table XIII, a specimen Run No. 1 (non-washed specimen) exhibited a color change of a great extent and undesirably large specific permittivity and dielectric dissipation factor. In contrast, specimens Run No. 3, 4, 6 and 7, which were washed at a temperature higher than 100° C., contained only below 100 ppm of Na+, and the color change was minor (Run Nos. 3 and 6) or no color change was observed (Run Nos. 4 and 7). The specific permittivity and the dielectric dissipation factor were small, and particularly those of Run Nos. 4 and 7 (Na+ concentration=below 50 ppm) were extremely small.

EXAMPLE 21

Polyethylene terephthalate having an intrinsic viscosity of 0.65, as measured in o-chlorophenol at 35° C., was metered by using a gear pump at a temperature of 295° C. and introduced into the mixing part of a screw extruder, maintained at a temperature of 285° C. A sodium alkyl sulfonate mixture, similar to that used in Example 1, was metered by using a gear pump at a temperature of 130° C. and introduced into the above-mentioned mixing part of the screw extruder. The amount of the sodium alkyl sulfonate mixture was 4% by weight based on the weight of the polyethylene terephthalate. A mixture of the polyethylene terephthalate and the sodium alkyl sulfonate mixture was melt-extruded through the screw extruder, and the extrudate was cut into chips and, then, dried. The dried chips were melt-spun through a spinneret having horse-shoe-shaped slits by a conventional procedure to obtain a bundle of hollow filaments. The hollow filaments were subjected to doubling, drawing and heat-setting by a conventional procedure to obtain a tow having a total fineness of 170,000 denier. The tow was cut by using a guillatine cutter into 3 mm lengths. The cut filaments were immersed in an aqueous sodium hydroxide solution having a concentration of 30 g/liter, at a temperature of 98±1° C. and at a bath ratio of 1:100, under agitation, for a predetermined period of time. The alkali-treated filaments were washed with water and, then, dried. The filaments were dispersed in water at a concentration of 1% and, then, beaten by using a disc-refiner supplied by Kumagai Riki K.K. to obtain a polyester sythetic pulp. Its average fiber diameter and variance in fiber diameter are shown in Table XIV, below. 1%, based on the weight of the pulp, of an internal binder (polyamide epichlorohydrin binder, "Polyfix 301" supplied by Showa Kobunshi K.K.) was added to the aqueous slurry of the pulp and then, the concentration was adjusted to 1 g/7.9 liters. A non-woven fabric was manufactured from the aqueous slurry of the pulp by using a TAPPI standard sheeting machine supplied by Toyo Seiki K.K., Japan. The obtained wet web was dried to obtain a polyester non-woven fabric. Properties of the non-woven fabric as a filtering medium are shown in Table XIV, below. For comparison purposes, non-woven glass fabrics were prepared from an aqueous slurry of glass microwool having a concentration of 1.84 g/7.9 liters. Properties of the non-woven glass fabrics are also shown in Table XIV, below.

TABLE XIV

| Run No. | Composition of non-woven fabric | Average fiber diameter (microns) | Variance in fiber diameter | Void of non woven fabric | Pressure drop Δp *1 (mmH₂O) | Permeability to 0.3 micron DO *2 (Co/Ci) |
|---|---|---|---|---|---|---|
| 1 | Organic fiberous fibril | 0.4 | 0.30 | 0.96 | 55 | 1.5 × 10⁻⁶ |
| 2 | Organic fiberous fibril | 1.0 | 0.35 | 0.95 | 24 | 5.2 × 10⁻⁵ |
| 3 | Organic fiberous fibril | 3.0 | 0.40 | 0.96 | 9 | 6.8 × 10⁻² |

TABLE XIV-continued

| Run No. | Composition of non-woven fabric | Average fiber diameter (microns) | Variance in fiber diameter | Void of non woven fabric | Pressure drop $\Delta p$ *1 (mmH$_2$O) | Permeability to 0.3 micron DO *2 (Co/Ci) |
|---|---|---|---|---|---|---|
| 4 | Glass microwoll | 0.5 | 0.24 | 0.95 | 45 | $6.1 \times 10^{-6}$ |
| 5 | Glass microwoll | 0.9 | 0.45 | 0.94 | 30 | $5.2 \times 10^{-5}$ |
| 6 | Glass microwoll | 3.4 | 0.31 | 0.95 | 8 | $1.3 \times 10^{-1}$ |
| 7 | Organic fibrous fibril | 0.5 | 0.35 | 0.88 | 85 | $3.2 \times 10^{-6}$ |
| 8 | Organic fibrous fibril | 0.6 | 0.90 | 0.94 | 41 | $5.5 \times 10^{-6}$ |
| 9 | Organic fibrous fibril | 5.3 | 0.39 | 0.96 | 4 | $7.1 \times 10^{-1}$ |
| 10 | Organic fibrous fibril | 0.03 | 0.29 | 0.87 | 580 | Impossible to measure |

*1 The pressure drop was determined by forcing air to pass through the specimen at a linear velocity of 4.75 cm/sec., and measuring the pressure drop by a monometer.
*2 The permeability to 0.3 micron DOP was determined by the same procedure as that mentioned in EXAMPLE 15.

As is seen from Table XIV, non-woven fabrics comprised of polyester fibrils having an average fiber diameter of from 0.05 to 5 microns exhibited good filtering characteristics, as compared with conventional non-woven glass microwool fabrics. When the average fiber diameter is below 0.05 micron, the pressure drop is very large, and, when the average fiber diameter is larger than 5 microns, the permeability to DOP is very small. With respect to porosity, non-woven fabrics having a porosity of from 0.90 to 0.98 exhibited good filtering characteristics.

EXAMPLE 22

Following a procedure similar to that mentioned in Example 21, two non-woven fabrics were prepared which were similar to Run Nos. 2 and 5 but no internal binder was used. Properties of the non-woven fabrics are shown in Table XV, below.

TABLE XV

| Run No. | Composition of non-woven fabric | Average fiber diameter (micron) | Variance in fiber diameter | Void of non-woven fabric | Tensile strength of non-woven fabric *1 (g/15 mm width) |
|---|---|---|---|---|---|
| 2' | Organic fibrous fibril | 1.0 | 0.35 | 0.96 | 151 |
| 5' | Glass microwool | 0.9 | 0.45 | 0.94 | 52 |

*1 The tensile strength was determined by using a UTM-1-10000C-PL type tensilon tester supplied by Toyo Baldwin K.K., at a specimen width of 15 mm, and at a grip distance of 50 mm and a grip separation rate of 50 mm/min.

The non-woven fabric of Run No. 2' exhibited good separation from the wire part of the sheet machine and had good formation and high strength, as composed with that of Run No. 5'.

We claim:

1. A process for preparing a synthetic linear polyester pulp, which comprises the steps of: forming a hollow fiber from a mixture consisting essentially of a linear aromatic polyester and 0.1 to 20% by weight, based on the weight of the linear aromatic polyester, of a metal salt of an organic sulfonic acid which is incompatible with said polyester and soluble in an alkaline solution, wherein the difference SP, between the solubility parameter SPc of said metal salt of an organic sulfonic acid and the solubility parameter SPe of said polyester satisfies the formula:

$$\Delta SP = |SPc - SPe| \geq 2;$$

said metal salt of the organic sulfonic acid is represented by the formula:

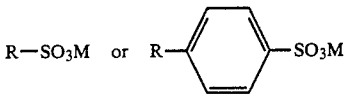

wherein R is an alkyl group which can be branched having from 3 to 30 carbon atoms an aryl or aralkyl group having 7 to 40 carbon atoms, and M is alkali metal or alkaline earth metal;
  drawing the hollow fiber;
  treating the drawn hollow fiber with an alkaline solution, to at least partially hydrolyze the polyester and to at least partially dissolve the metal salt of an organic sulfonic acid, until the hollow fiber loses from about 20 to 80% of its weight; and beating the alkaline solution-treated hollow fiber to fibrillate it.

2. A process according to claim 1, wherein said linear aromatic polyester comprises at least 80% by mole of a recurring unit represented by the formula:

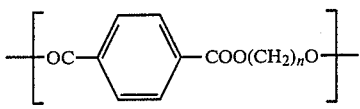

where n is an integer of from 2 to 6.

3. A process according to claim 2, wherein the integer "n" is 2.

4. A process of claim 1, 2 or 3 wherein the linear aromatic polyester has an intrinsic viscosity of from 0.3 to 1.15 as measured in orthochlorophenol at 35° C.

5. A process according to claim 1, wherein said difference $\Delta SP$ satisfies the formula:

$$\Delta SP = |SPc - SPe| \geq 3.0.$$

6. A process of claim 1, 2 or 3, wherein the amount of said metal salt of an organic sulfonic acid is in the range of from 1% to 10% by weight based on the weight of the linear aromatic polyester.

7. A process according to claim 1, wherein the hollow fiber has a hollow percentage of from 5% to 50%.

8. A process according to claim 1, wherein the hollow fiber has a wall thickness not greater than about 6 microns.

9. A process according to claim 1, wherein the hollow fiber has a wall thickness not greater than about 4 microns.

10. A process according to claim 1, 2, or 3, wherein the hollow fiber is, prior to the treatment with the alkali solution, heat-treated at a temperature not lower than the temperature which is 20° C. higher than the softening point of the metal salt of an organic sulfonic acid, but not higher than the temperature which is 10° C. lower than the softening point of the linear aromatic polyester.

11. A process according to claim 10, wherein the heat-treating temperature is not lower than the temperature which is 30° C. higher than the softening point of the metal salt of an organic sulfonic acid but not higher than the temperature which is 20° C. lower than the softening point of the linear aromatic polyester.

12. A prociess according to claim 1, 2 or 3 wherein said alkaline solution is an aqueous solution of at least one alkali selected from the group consisting of sodium hydroxide and potassium hydroxide.

13. A process according to claim 1, 2 or 3, wherein said alkaline solution is an aqueous solution containing an inorganic alkali and an organic base.

14. A process according to claim 1, 2 or 3, wherein said treatment with the alkaline solution is effected by using an aqueous inorganic alkali solution and an aqueous organic base solution.

15. A process according to claim 1, 2 or 3, wherein said treatment with the alkali solution is effected by immersing the hollow fiber in an aqueous solution containing 0.5 to 50 moles, per a recurring unit of the linear aromatic polyester, of an inorganic alkali or an organic base, at a bath ratio of from 1:30 to 1:300.

16. A process according to claim 1, 2 or 3, wherein the alkaline solution-treated hollow fiber is beaten to an extent such that the beaten product has a freeness of 50 to 700 as expressed in the Canadian standard freeness number.

17. A synthetic polyester pulp prepared by the process of claim 1, 2 or 3.

* * * * *